(12) United States Patent
Duc

(10) Patent No.: US 12,052,279 B1
(45) Date of Patent: Jul. 30, 2024

(54) DENIAL-OF-SERVICE (DOS) ATTACK PROTECTION AND MITIGATION

(71) Applicant: Electronic Arts Inc., Redwood City, CA (US)

(72) Inventor: Samy Thomas Jean Duc, Northridge, CA (US)

(73) Assignee: Electronic Arts Inc., Redwood City, CA (US)

( * ) Notice: Subject to any disclaimer, the term of this patent is extended or adjusted under 35 U.S.C. 154(b) by 260 days.

(21) Appl. No.: 17/506,434

(22) Filed: Oct. 20, 2021

(51) Int. Cl.
*H04L 9/40* (2022.01)

(52) U.S. Cl.
CPC ...... *H04L 63/1458* (2013.01); *H04L 63/0236* (2013.01); *H04L 63/1416* (2013.01); *H04L 63/1425* (2013.01); *H04L 63/20* (2013.01)

(58) Field of Classification Search
CPC .. H04L 63/1458; H04L 63/1425; H04L 63/20
See application file for complete search history.

(56) References Cited

U.S. PATENT DOCUMENTS

| | | | |
|---|---|---|---|
| 11,343,376 B1* | 5/2022 | Van Arkel | H04M 3/436 |
| 2002/0029260 A1* | 3/2002 | Dobbins | H04L 63/102 |
| | | | 709/219 |
| 2010/0088423 A1* | 4/2010 | Mazzagatte | H04L 63/08 |
| | | | 709/229 |
| 2011/0055921 A1* | 3/2011 | Narayanaswamy | |
| | | | H04L 63/1458 |
| | | | 726/22 |
| 2023/0063243 A1* | 3/2023 | St. Pierre | H04L 47/2483 |

* cited by examiner

*Primary Examiner* — Viet D Vu
(74) *Attorney, Agent, or Firm* — McDermott Will & Emery LLP

(57) ABSTRACT

Various aspects of the subject technology relate to systems, methods, and machine-readable media for authenticating user accounts. The method includes authenticating at least one user account of a plurality of user accounts for lobbying into a session. The method includes generating at least one authenticated socket in a server for each authenticated user account. The method includes adding the at least one user account to the at least one authenticated socket. The method includes adding non-authenticated user accounts to non-authenticated sockets of a plurality of non-authenticated sockets. The method includes detecting network traffic flowing into the plurality of authenticated sockets and the plurality of non-authenticated sockets. The method includes disconnecting non-authenticated user accounts from the server when a threshold amount of suspicious and/or malicious network traffic is detected in a non-authenticated socket.

19 Claims, 5 Drawing Sheets

DENIAL-OF-SERVICE (DOS) ATTACK PROTECTION AND MITIGATION

BACKGROUND

Video games permit for an entertaining way to interact with others in a friendly and competitive environment. Conventional video games include online multiplayer games where players may play against each other either one-on-one or as a part of a team. Unfortunately, due to the competitive nature of these types of video games, some players may attempt to gain an unfair advantage by exploiting limitations in network connectivity through denial-of-service (DoS) attacks. In addition to preventing the network from functioning correctly, such DoS attacks negatively affect player enjoyment and are undesirable.

BRIEF SUMMARY

The subject disclosure provides for systems and methods for protecting and mitigating against denial-of-service (DoS) attacks. In an aspect, a socket per user server connectivity system prioritizes good network traffic to limit incoming malicious network traffic. The system restructures the way a server receives network traffic by creating authenticated sockets for each authenticated user in a multiplayer session. According to aspects, users are authenticated when lobbying into a session. A user may lose their authenticated status upon detection of suspicious and/or malicious network traffic coming into their respective socket. In such cases, the non-authenticated socket is de-prioritized and read last, so that legitimate network traffic is guaranteed to be processed in each server tick (e.g., a single update of a game simulation).

According to one embodiment of the present disclosure, a computer-implemented method for authenticating users is provided. The method includes authenticating at least one user of a plurality of users for lobbying into a session. The method includes generating at least one authenticated socket in a server for each authenticated user. The method includes adding the at least one user to the at least one authenticated socket. The method includes adding non-authenticated users to non-authenticated sockets of a plurality of non-authenticated sockets. The method includes detecting network traffic flowing into the plurality of authenticated sockets and the plurality of non-authenticated sockets. The method includes disconnecting non-authenticated users from the server when a threshold amount of suspicious and/or malicious network traffic is detected in a non-authenticated socket.

According to one embodiment of the present disclosure, a system is provided including a processor and a memory comprising instructions stored thereon, which when executed by the processor, causes the processor to perform a method for authenticating user accounts. The method includes authenticating at least one user account of a plurality of user accounts for lobbying into a session. The method includes generating at least one authenticated socket in a server for each authenticated user account. The method includes adding the at least one user account to the at least one authenticated socket. The method includes adding non-authenticated user accounts to non-authenticated sockets of a plurality of non-authenticated sockets. The method includes detecting network traffic flowing into the plurality of authenticated sockets and the plurality of non-authenticated sockets. The method includes disconnecting non-authenticated user accounts from the server when a threshold amount of suspicious and/or malicious network traffic is detected in a non-authenticated socket.

According to one embodiment of the present disclosure, a non-transitory computer-readable storage medium is provided including instructions (e.g., stored sequences of instructions) that, when executed by a processor, cause the processor to perform a method for authenticating user accounts. The method includes authenticating at least one user account of a plurality of user accounts for lobbying into a session. The method includes generating at least one authenticated socket in a server for each authenticated user account. The method includes adding the at least one user account to the at least one authenticated socket. The method includes adding non-authenticated user accounts to non-authenticated sockets of a plurality of non-authenticated sockets. The method includes detecting network traffic flowing into the plurality of authenticated sockets and the plurality of non-authenticated sockets. The method includes disconnecting non-authenticated user accounts from the server when a threshold amount of suspicious and/or malicious network traffic is detected in a non-authenticated socket.

According to one embodiment of the present disclosure, a system is provided that includes means for storing instructions, and means for executing the stored instructions that, when executed by the means, cause the means to perform a method for authenticating user accounts. The method includes authenticating at least one user account of a plurality of user accounts for lobbying into a session. The method includes generating at least one authenticated socket in a server for each authenticated user account. The method includes adding the at least one user account to the at least one authenticated socket. The method includes adding non-authenticated user accounts to non-authenticated sockets of a plurality of non-authenticated sockets. The method includes detecting network traffic flowing into the plurality of authenticated sockets and the plurality of non-authenticated sockets. The method includes disconnecting non-authenticated user accounts from the server when a threshold amount of suspicious and/or malicious network traffic is detected in a non-authenticated socket.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
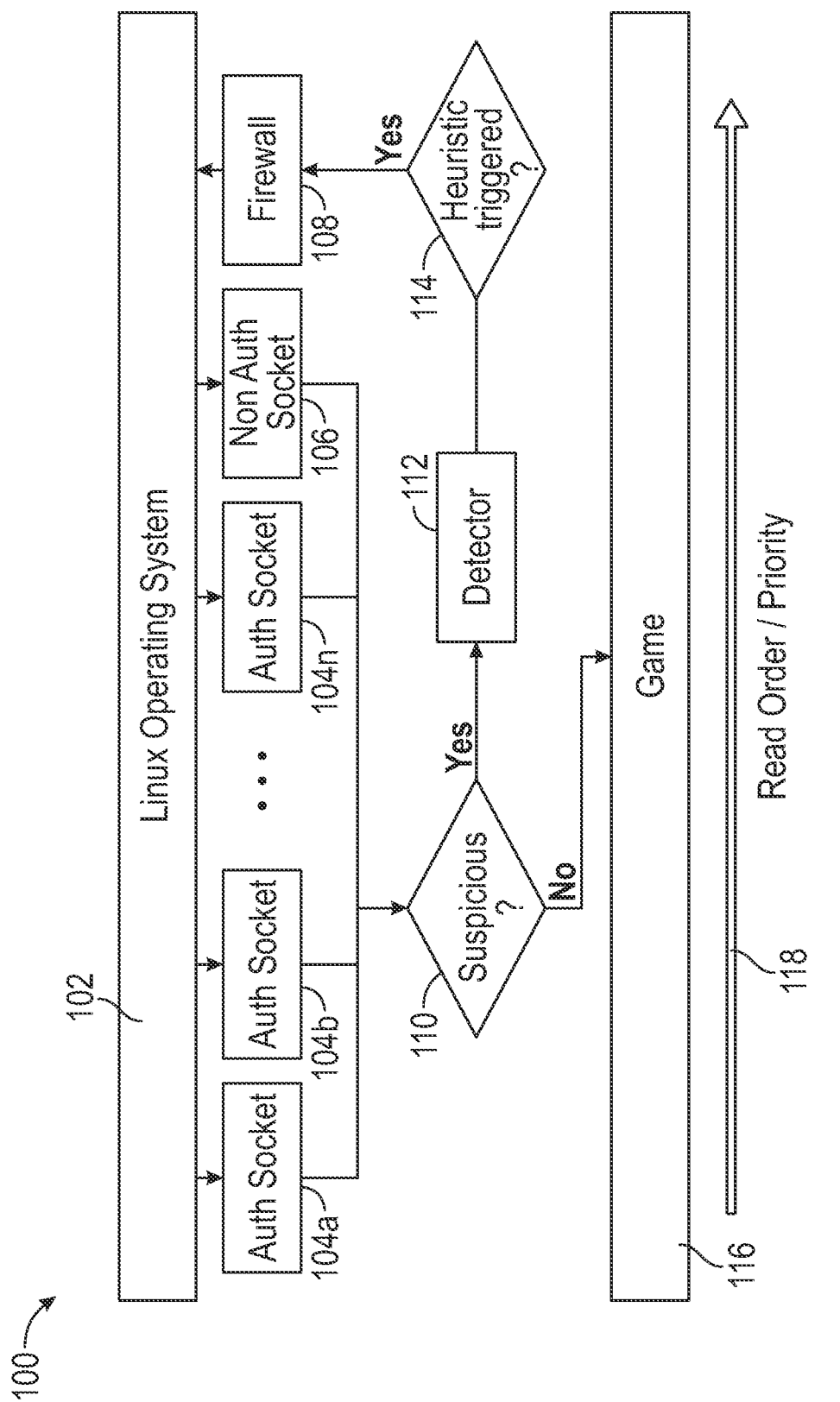
FIG. 1 illustrates an exemplary diagram for authenticating users in an online multiplayer game, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Video games permit for an entertaining way to interact with others in a friendly and competitive environment. Conventional video games include online multiplayer games where players may play against each other either one-on-one or as a part of a team. Unfortunately, due to the competitive nature of these types of video games, some players may attempt to gain an unfair advantage by exploiting limitations in network connectivity through denial-of-service (DoS) attacks. In addition to preventing the network from functioning correctly, such DoS attacks negatively affect player enjoyment and are undesirable.

DoS attacks include online attacks where a perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled.

In a distributed denial-of-service attack (DDoS attack), the incoming traffic flooding the victim may originate from many different sources. This effectively makes it impossible to stop the attack simply by blocking a single source. A DoS or DDoS attack is analogous to a group of people crowding the entry door of a shop, making it hard for legitimate customers to enter, thus disrupting trade.

Both DoS and DDoS attacks are a prevalent issue among multiplayer video games that directly impact the integrity of competitive leaderboards and game modes. In some instances, malicious actors (e.g., hackers) can shut down game servers by overloading the network traffic and making network resources unavailable to bona fide actors (e.g., the players of the multiplayer online game). For example, hackers may perform a targeted DDoS on a specific online video game instance to exploit game features to manipulate a point system and/or otherwise cause an unfair advantage to themselves.

In some instances, a "laser DoS" (e.g., a small scale targeted attack of short duration) is utilized by attackers to overflow a machine or a group of machines by sending more network traffic than the machines (e.g., the game server) can handle. For example, the laser DoS can force disconnection of all players suddenly at once. The attacker may then reconnect to the game instance, kill everyone that was disconnected, and unfairly earn points. As a result, some of the top ranking players in a leaderboard may not be skilled players, but instead are hackers. This fosters mistrust in the point system, which is an important metric for player engagement and retention, causes the game to feel broken for players, and unfortunately results in decreased enjoyment as well as diluted competition.

Conventional matchmaking techniques do not adequately address the threat of DoS attacks. Technical problems include overflows in received buffer sizes on User Datagram Protocol (UDP) sockets. For example, when the buffer is full, the operating system of the game servers (e.g., software running on a machine) will start dropping the incoming packets. This means that malicious packets may take the place of legitimate packets, which will result in player disconnections. Another technical problem is that the game server takes too much time to read all buffered packets. For example, a tick (e.g., a single update of a game simulation) must be completed in under 50 ms. If not, clients will be disconnected from the game server. There is a strong correlation between both these technical issues, and so a solution to the buffer overflowing may be to make the buffer bigger. However, this would only exacerbate the issue of the game server taking too much time to read all the buffered packets. Therefore, there is a need for a better approach that overcomes these shortcomings.

The subject disclosure provides for systems and methods for protecting and mitigating against denial-of-service (DoS) attacks. In an aspect, a socket per user server connectivity system prioritizes good network traffic to limit incoming malicious network traffic. The system restructures the way a game server receives network traffic by creating authenticated sockets for each authenticated user in a multiplayer game. According to aspects, users are authenticated when lobbying into a game. A user may lose their authenticated status upon detection of suspicious and/or malicious network traffic coming into their respective socket. In such cases, the non-authenticated socket is de-prioritized and read last, so that legitimate network traffic is guaranteed to be processed in each server tick.

According to aspects, the game server may utilize a socket per user server connectivity system that prioritizes good network traffic to limit incoming malicious network traffic. As a result, the system restructures the way a game server receives network traffic by creating authenticated sockets for each authenticated user in a multiplayer game. For example, users are authenticated when lobbying into a game.

According to aspects, a user can lose their authenticated status by the detection of some suspicious/malicious network traffic coming into their respective socket. In such cases, the non-authenticated socket is deprioritized and read last, so that legitimate network traffic is guaranteed to be processed in each server tick.

According to aspects, a minimum amount of traffic from the non-authenticated socket is also still processed, so that the malicious user remains connected to the game. It is important to maintain this stability with the malicious user so they do not have any indication that their malicious network traffic is impacting the server, as it often serves as an indicator that they are beginning to impact the server. In an implementation, when some threshold amount of suspicious or malicious network traffic is detected on the non-authenticated socket, the user will be disconnected from the game server and likely receive a sanction. However, if no further activity is detected, the user can reclaim their authenticated status.

According to aspects, sockets of authenticated users may be forked. For example, after a user manages to become authenticated by the game server, the socket that the user is in may be forked into an authenticated socket for the user. The users may be processed based on a priority, and each socket may include its own receive buffer.

According to aspects, each socket may continue to monitor incoming packets, and may generate reports of bad network traffic patterns. If the bad network traffic patterns reach a threshold level, a heuristic may be triggered based on a status of a user. For example, different sanctions may be imposed against authenticated users than for unknown sources. In an implementation, sanctions may include IP bans, temporary lock-outs, reduction in points, etc.

The disclosed system addresses a problem in traditional video games tied to computer technology, namely, the technical problem of preventing unfair overloading of game server resources to gain an unfair advantage against other players. The disclosed system solves this technical problem by providing a solution also rooted in computer technology, namely, by providing for a technique for authenticating users in an online multiplayer game. The disclosed system also improves the functioning of the computer itself because it reduces the cost of system resources and increases authentication efficiency for users.

FIG. 1 illustrates an exemplary diagram 100 for authenticating users (e.g., user accounts, user devices, etc.) in an online multiplayer game 116, according to certain aspects of the present disclosure. For example, the online multiplayer game 116 may be accessed through a game server (e.g., video game server). In an implementation, the game server may be running on a Linux operating system 102. It is understood that other operating systems may be supported.

According to aspects, the operating system 102 may cause forks of authenticated sockets 104a, 104b, to 104n when users are authenticated. For example, users logging into the game 116 may first be placed into an unauthenticated socket 106. Once authenticated, the unauthenticated socket 106 may fork out an authenticated socket 104a, and the user may be placed into the authenticated socket 104a that was forked out. For example, users may be processed based on a read order/priority 118, such as by order of logging in, previously authenticated statuses, user logging history, etc. In an implementation, up to 60 authenticated sockets 104 may be forked out, such that each player in a match (e.g., a session) may occupy a single authenticated socket 104. It is understood that more or less authenticated sockets 104 may be forked out depending on how many players an online game supports at once (e.g., from 1 up to n sockets).

According to aspects, each authentication socket 104 may be continuously monitored during a match (e.g., a session) to detect whether there is suspicious activity 110. If suspicious activity is detected, a detector 112 may determine whether the suspicious activity has risen to a level (e.g., surpasses a threshold) that may trigger a heuristic 114. For example, an attacker that somehow became authenticated may attempt to perform a DoS attack on the game server. The suspicious activity 110 may be initially detected, but may not have surpassed the threshold of suspicious activity required to trigger the heuristic 114, and so the detector 112 may closely monitor the suspicious activity 110. Once the suspicious activity 110 rises to a level that surpasses the threshold, the detector 112 may cause the heuristic 114 to be triggered. Because the attacker is not automatically disconnected from the server (e.g., booted off), the attacker will not be aware that their suspicious activity is being monitored closely by the detector 112. This increases efficacy of preventing repeat offenders, and reduces the likelihood of bona fide users being booted off the server for network irregularities that were mistakenly interpreted as malicious/suspicious.

According to aspects, once triggered, the heuristic 114 may impose a sanction on the attacker based on an authentication level of the attacker. If the attacker had a high level of authentication, then the sanction may be less severe than if the attacker were an anonymous user. In an implementation, the sanction may include, but is not limited to, IP bans, temporary lock-outs, reduction in points, penalties, etc. In an aspect, a firewall 108 may be included between the heuristic 114 and the operating system 102 to increase security of the game server.

According to aspects, if the suspicious activity 110 decreases and/or ceases, then the user associated with the suspicious activity 110 may reclaim their authenticated status in an authentication socket 104. The user may proceed with participating in the game 116.

Figure 2:
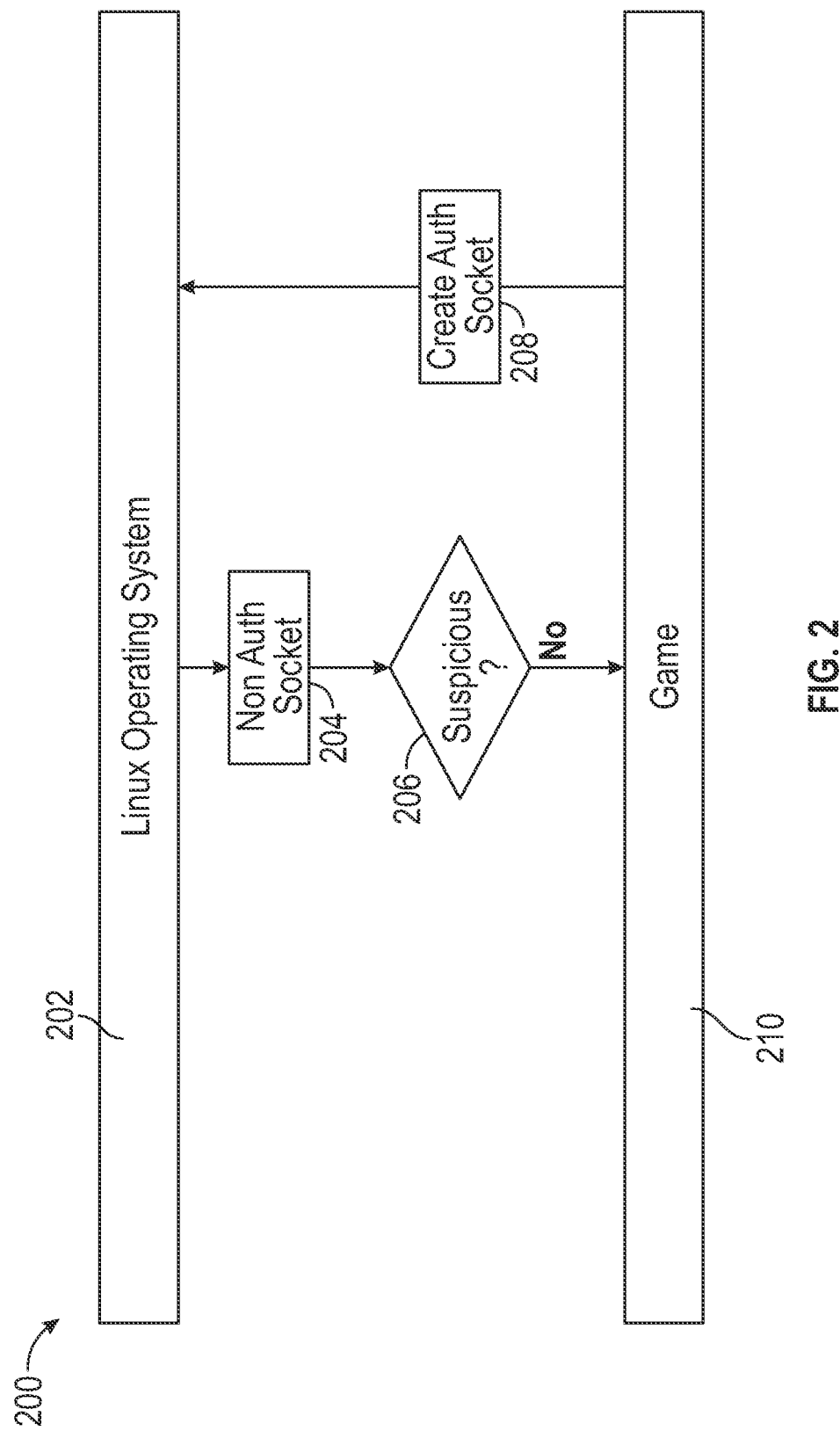
FIG. 2 illustrates another exemplary diagram for authenticating users in an online multiplayer game, according to certain aspects of the present disclosure.

FIG. 2 illustrates another exemplary diagram 200 for authenticating users (e.g., user accounts, user devices, etc.) in an online multiplayer game 210, according to certain aspects of the present disclosure. For example, the online multiplayer game 210 may be accessed through a game server (e.g., a server, etc.). In an implementation, the game server may be running on a Linux operating system 202. It is understood that other operating systems may be supported.

According to aspects, when users are lobbying into the game 210, the users may each first be placed in a non-authenticated socket 204 for monitoring. For example, there may be as many non-authenticated sockets 204 as needed for each non-authenticated user.

According to aspects, if no suspicious activity is detected 206, an authenticated socket is created (e.g., forked out) 208. For example, the user may become authenticated, and once authenticated, the user is placed into the authenticated socket 208. If the user does not become authenticated, then the user may remain in the non-authenticated socket 204 until the user either gets disconnected (e.g., booted off) or authenticated.

According to aspects, the process illustrated by the diagram 200 may occur in conjunction with the process illustrated by diagram 100 in FIG. 1. For example, the users may first be placed into the non-authenticated socked 204 for authentication. Once no suspicious activity is detected 206, the authenticated socket is forked 208, and the user is placed into an authenticated socket 104.

It is understood that authenticating users, as described herein, may refer to one or more of authenticating user accounts and/or user devices. For example, the user accounts and/or user devices may be associated with (i.e., correspond to) and/or controlled by (i.e., managed by) users.

Figure 3:
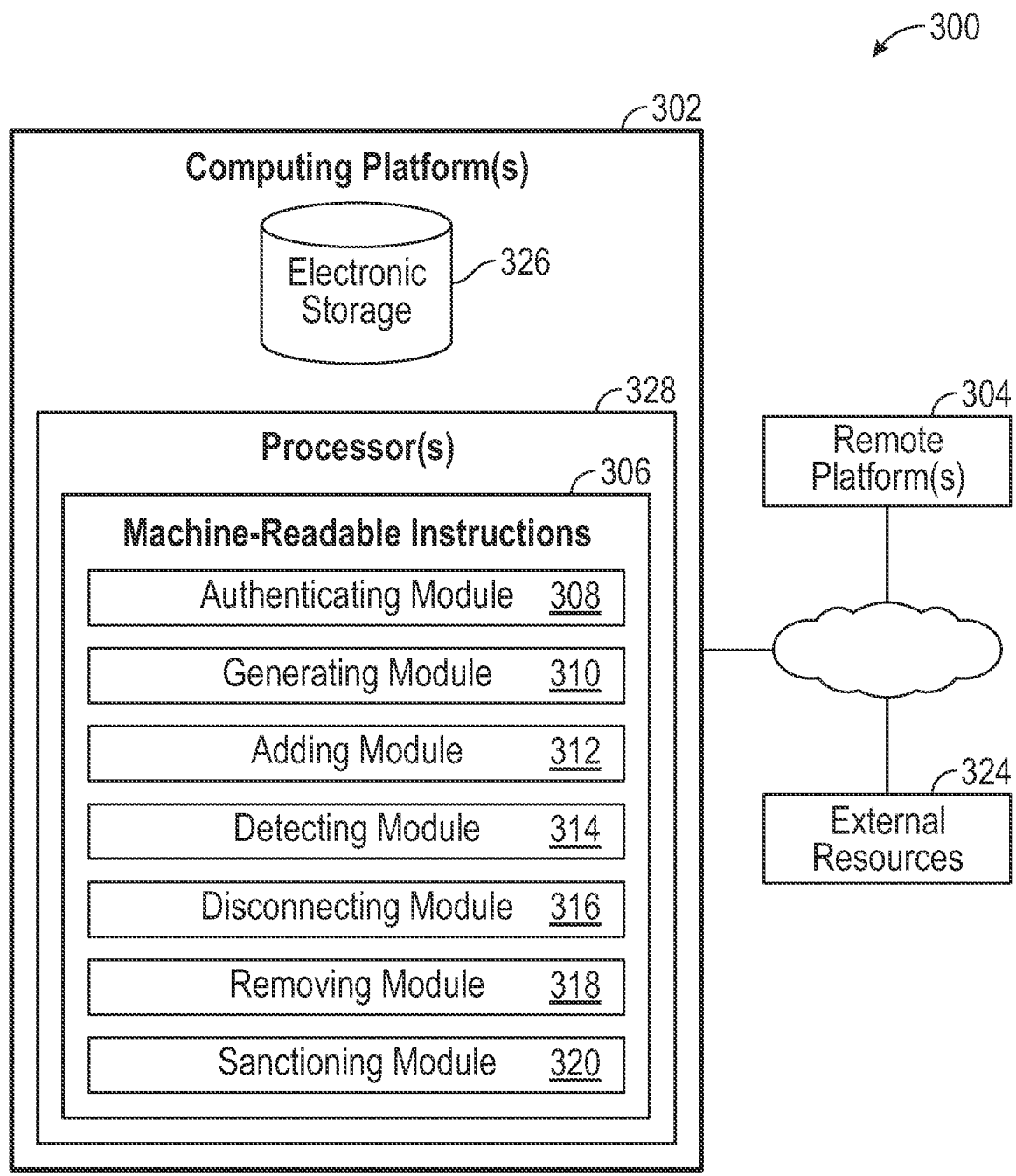
FIG. 3 illustrates a system configured for authenticating users in an online multiplayer game, in accordance with one or more implementations.

FIG. 3 illustrates a system 300 configured for authenticating users (e.g., user accounts, user devices, etc.) in an online multiplayer game, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of authenticating module 308, generating module 310, adding module 312, detecting module 314, disconnecting module 316, removing module 318, and/or sanctioning module 320, and/or other instruction modules.

Authenticating module 308 may be configured to authenticate at least one user (e.g., user account) of a plurality of users (e.g., user accounts) for lobbying into a match (e.g., a session) of an online multiplayer game.

Generating module 310 may be configured to generate at least one authenticated socket in a server (e.g., a video game server) for each authenticated user. The generating module 310 may also be configured to generate the plurality of non-authenticated sockets in the server.

Adding module 312 may be configured to add the at least one user to the at least one authenticated socket. The adding module 312 may also be configured to add non-authenticated users to non-authenticated sockets of a plurality of non-authenticated sockets. The adding module 312 may also be configured to add at least one user to a non-authenticated socket of the plurality of non-authenticated sockets.

Detecting module 314 may be configured to detect network traffic flowing into the plurality of authenticated sockets and the plurality of non-authenticated sockets. The detecting module 314 may also be configured to detect network traffic flowing into the at least one authenticated socket in relation to the at least one user.

Disconnecting module 316 may be configured to disconnect non-authenticated users from the server when a threshold amount of suspicious and/or malicious network traffic is detected in a non-authenticated socket.

Removing module 318 may be configured to remove the at least one user from the at least one authenticated socket when the threshold amount of suspicious and/or malicious network traffic is detected in the at least one authenticated socket.

Sanctioning module 320 may be configured to sanction users that are disconnected from the server.

According to aspects, at least one user is added back to an authenticated socket when no further suspicious and/or malicious activity is detected. According to aspects, a minimum amount of network traffic from each non-authenticated socket is processed. According to aspects, at least 60 authentication sockets are generated.

According to aspects, the sanctioning is based on a status of each user that was disconnected. According to aspects, there are as many authentication sockets as users.

According to aspects, the generating may include forking available sockets after authentication of users. According to aspects, all users are added to a non-authenticated socket of the plurality of non-authenticated sockets prior to the authenticating.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, and/or 320, and/or other modules. Processor(s) 328 may be configured to execute modules 308, 310, 312, 314, 316, 318, and/or 320, and/or other modules by software, hardware, firmware, some combination of software, hardware, and/or firmware, and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, and/or 320 are illustrated in FIG. 3 as being implemented within a single processing unit, in implementations in which processor(s) 328 includes multiple processing units, one or more of modules 308, 310, 312, 314, 316, 318, and/or 320 may be implemented remotely from the other modules. The description of the functionality provided by the different modules 308, 310, 312, 314, 316, 318, and/or 320 described below is for illustrative purposes, and is not intended to be limiting, as any of modules 308, 310, 312, 314, 316, 318, and/or 320 may provide more or less functionality than is described. For example, one or more of modules 308, 310, 312, 314, 316, 318, and/or 320 may be eliminated, and some or all of its functionality may be provided by other ones of modules 308, 310, 312, 314, 316, 318, and/or 320. As another example, processor(s) 328 may be configured to execute one or more additional modules that may perform some or all of the functionality attributed below to one of modules 308, 310, 312, 314, 316, 318, and/or 320.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
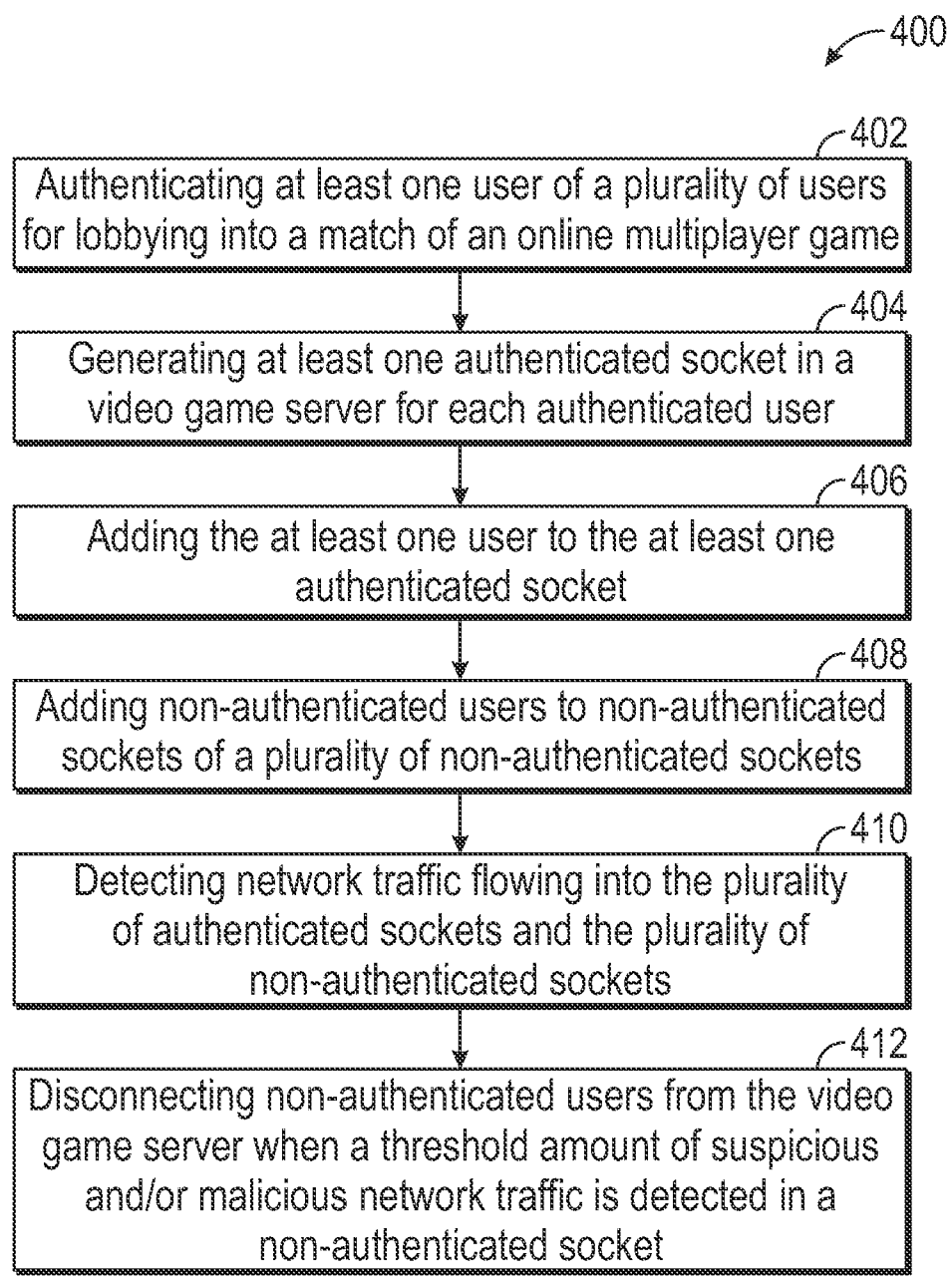
FIG. 4 illustrates an example flow diagram for authenticating users in an online multiplayer game, according to certain aspects of the present disclosure.

FIG. 4 illustrates an example flow diagram (e.g., process 400) for authenticating users (e.g., user accounts, user devices, etc.) in an online multiplayer game (e.g., an online multiplayer session), according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, at least one user (e.g., user account) of a plurality of users (e.g., user accounts) are authenticated for lobbying into a match (e.g., a session) of an online multiplayer game.

At step 404, at least one authenticated socket is generated in a video game server (e.g., a server) for each authenticated user.

At step 406, the at least one user is added to the at least one authenticated socket.

At step 408, non-authenticated users are added to non-authenticated sockets of a plurality of non-authenticated sockets.

At step 410, network traffic flowing into the plurality of authenticated sockets and the plurality of non-authenticated sockets is detected.

At step 412, non-authenticated users are disconnected from the video game server when a threshold amount of suspicious and/or malicious network traffic is detected in a non-authenticated socket.

For example, as described above in relation to FIGS. 1-3, at step 402, at least one user (e.g., user account, user device, etc.) of a plurality of users (e.g., user accounts, user devices, etc.) are authenticated (e.g., via authenticating module 308) for lobbying into a match (e.g., a session) of an online multiplayer game (e.g., game 116, 210). At step 404, at least one authenticated socket (e.g., authenticated socket 104) is generated in a video game server for each authenticated user. At step 406, the at least one user is added to the at least one authenticated socket (e.g., via adding module 312). At step 408, non-authenticated users are added to non-authenticated sockets (e.g., non-authenticated socket 106, 204) of a plurality of non-authenticated sockets. At step 410, network traffic flowing into the plurality of authenticated sockets and the plurality of non-authenticated sockets is detected (e.g., via detecting module 314, detector 112). At step 412, non-authenticated users are disconnected from the video game server when a threshold amount of suspicious and/or malicious network traffic (e.g., suspicious traffic 110, 206) is detected in a non-authenticated socket.

According to an aspect, the process 400 further includes detecting network traffic flowing into the at least one authenticated socket in relation to the at least one user. The process 400 further includes removing the at least one user from the at least one authenticated socket when the threshold amount of suspicious and/or malicious network traffic is detected in the at least one authenticated socket. The process 400 further includes adding the at least one user to a non-authenticated socket of the plurality of non-authenticated sockets.

According to an aspect, the at least one user is added back to an authenticated socket when no further suspicious and/or malicious activity is detected. According to an aspect, a minimum amount of network traffic from each non-authenticated socket is processed.

According to an aspect, the process 400 further includes sanctioning users that are disconnected from the video game server. According to an aspect, the sanctioning is based on a status of each user that was disconnected.

According to an aspect, there are as many authentication sockets as users. According to an aspect, at least 60 authentication sockets are generated.

According to an aspect, the generating may include forking available sockets after authentication of users. According to an aspect, all users are added to a non-authenticated socket of the plurality of non-authenticated sockets prior to the authenticating.

According to an aspect, the process 400 further includes generating the plurality of non-authenticated sockets in the video game server.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
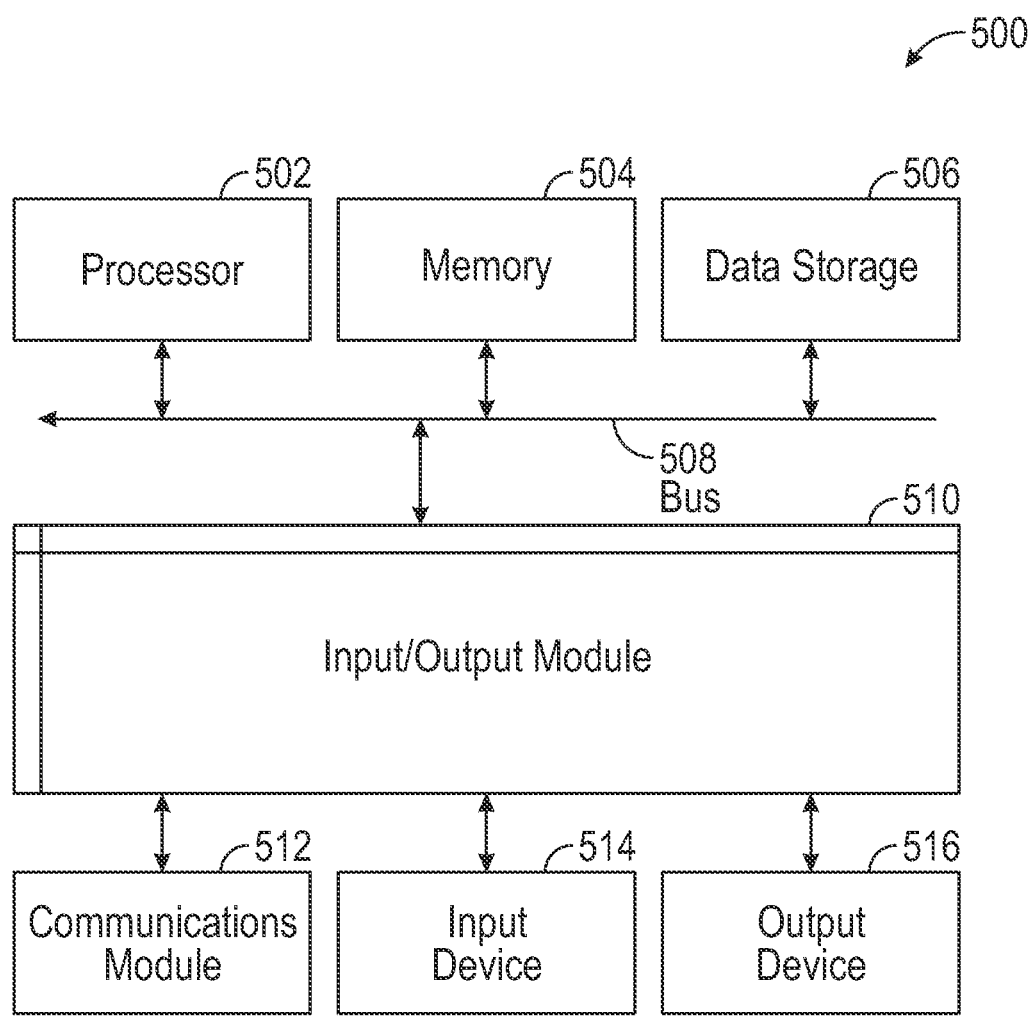
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network, the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for authenticating user accounts, comprising:
   authenticating at least one user account of a plurality of user accounts for lobbying into a session;
   generating at least one authenticated socket in a server for each authenticated user account;
   adding the at least one user account to the at least one authenticated socket; adding non-authenticated user accounts to non-authenticated sockets of a plurality of non-authenticated sockets;
   detecting network traffic flowing into the plurality of authenticated sockets and the plurality of non-authenticated sockets;
   disconnecting non-authenticated user accounts from the server when a threshold amount of suspicious and/or malicious network traffic is detected in a non-authenticated socket; and
   sanctioning user accounts, wherein sanctioning the user accounts is based on a level of authentication associated with the user.

2. The computer-implemented method of claim 1, further comprising:
   detecting network traffic flowing into the at least one authenticated socket in relation to the at least one user account;
   removing the at least one user account from the at least one authenticated socket when the threshold amount of suspicious and/or malicious network traffic is detected in the at least one authenticated socket; and
   adding the at least one user account to a non-authenticated socket of the plurality of non-authenticated sockets.

3. The computer-implemented method of claim 2, wherein the at least one user account is added back to an authenticated socket when no further suspicious and/or malicious activity is detected.

4. The computer-implemented method of claim 1, wherein a minimum amount of network traffic from each non-authenticated socket is processed.

5. The computer-implemented method of claim 1, wherein the sanctioning is based on a status of each user account that was disconnected.

6. The computer-implemented method of claim 1, wherein there are as many authentication sockets as user accounts.

7. The computer-implemented method of claim 1, wherein at least 60 authentication sockets are generated.

8. The computer-implemented method of claim 1, wherein the generating comprises forking available sockets after authentication of user accounts.

9. The computer-implemented method of claim 1, further comprising: generating the plurality of non-authenticated sockets in the server.

10. The computer-implemented method of claim 1, wherein all user accounts are added to a non-authenticated socket of the plurality of non-authenticated sockets prior to the authenticating.

11. A system for authenticating user accounts, comprising:
   a processor; and
   a memory comprising instructions stored thereon, which when executed by the processor, causes the processor to perform:
      authenticating at least one user account of a plurality of user accounts for lobbying into a session;
      generating at least one authenticated socket in a server for each authenticated user account;
      adding the at least one user account to the at least one authenticated socket;
      adding non-authenticated user accounts to non-authenticated sockets of a plurality of non-authenticated sockets;
      detecting network traffic flowing into the plurality of authenticated sockets and the plurality of non-authenticated sockets;
      disconnecting non-authenticated user accounts from the server when a threshold amount of suspicious and/or malicious network traffic is detected in a non-authenticated socket; and
      sanctioning user accounts, wherein sanctioning the user accounts is based on a level of authentication associated with the user.

12. The system of claim 11, further comprising stored sequences of instructions, which when executed by the processor, cause the processor to perform:
   detecting network traffic flowing into the at least one authenticated socket in relation to the at least one user account;
   removing the at least one user account from the at least one authenticated socket when the threshold amount of suspicious and/or malicious network traffic is detected in the at least one authenticated socket; and
   adding the at least one user account to a non-authenticated socket of the plurality of non-authenticated sockets.

13. The system of claim 12, wherein the at least one user account is added back to an authenticated socket when no further suspicious and/or malicious activity is detected.

14. The system of claim 11, wherein a minimum amount of network traffic from each non-authenticated socket is processed.

15. The system of claim 11, wherein the sanctioning is based on a status of each user account that was disconnected.

16. The system of claim 11, wherein there are as many authentication sockets as user accounts.

17. The system of claim 11, wherein at least 60 authentication sockets are generated.

18. A non-transitory computer-readable storage medium comprising instructions stored thereon, which when executed by one or more processors, cause the one or more processors to perform a method for authenticating user accounts, the method comprising:
   authenticating at least one user account of a plurality of user accounts for lobbying into a session;
   generating at least one authenticated socket in a server for each authenticated user account;
   adding the at least one user account to the at least one authenticated socket; adding non-authenticated user accounts to non-authenticated sockets of a plurality of non-authenticated sockets;
   detecting network traffic flowing into the plurality of authenticated sockets and the plurality of non-authenticated sockets;
   disconnecting non-authenticated user accounts from the server when a threshold amount of suspicious and/or malicious network traffic is detected in a non-authenticated socket; and
   sanctioning user accounts, wherein sanctioning the user accounts is based on a level of authentication associated with the user.

19. The method of claim 1, wherein disconnecting non-authenticated user accounts from the server when a threshold amount of suspicious and/or malicious network traffic is detected in a non-authenticated socket comprises adding a firewall to the non-authenticated user account.

\* \* \* \* \*